(12) United States Patent
Sedmak

(10) Patent No.: US 8,845,324 B2
(45) Date of Patent: Sep. 30, 2014

(54) DEVICE FOR CONTROLLING REGENERATIVE BURNERS

(75) Inventor: Patrice Sedmak, Laimont (FR)

(73) Assignee: Fives Stein (FR)

( * ) Notice: Subject to any disclaimer, the term of this patent is extended or adjusted under 35 U.S.C. 154(b) by 532 days.

(21) Appl. No.: 13/054,026

(22) PCT Filed: Jun. 25, 2009

(86) PCT No.: PCT/IB2009/052742
§ 371 (c)(1),
(2), (4) Date: Jan. 13, 2011

(87) PCT Pub. No.: WO2010/007547
PCT Pub. Date: Jan. 21, 2010

(65) Prior Publication Data
US 2011/0111355 A1 May 12, 2011

(30) Foreign Application Priority Data
Jul. 15, 2008 (FR) ...................................... 08 04020

(51) Int. Cl.
| | |
|---|---|
| F23C 9/00 | (2006.01) |
| F23L 13/04 | (2006.01) |
| F23L 15/02 | (2006.01) |
| F23C 3/00 | (2006.01) |
| F28D 17/04 | (2006.01) |
| F23D 14/66 | (2006.01) |
| F23L 17/16 | (2006.01) |

(52) U.S. Cl.
CPC . *F23C 9/00* (2013.01); *F23L 13/04* (2013.01); *F23L 15/02* (2013.01); *F23C 3/002* (2013.01); *F23C 2900/09002* (2013.01); *F28D 17/04* (2013.01); *F23D 14/66* (2013.01); *F23L 17/16* (2013.01)

USPC ........... 431/115; 431/116; 431/180; 431/182; 48/187; 432/180

(58) Field of Classification Search
CPC ........................................................ F23C 9/00
USPC .................. 431/115, 116, 182, 180; 432/180; 137/625.17, 625.2, 625.46; 48/187
See application file for complete search history.

(56) References Cited

U.S. PATENT DOCUMENTS

| | | |
|---|---|---|
| 1,635,939 A | 7/1927 | Isley |
| 3,170,680 A | 2/1965 | Keffer |

(Continued)

FOREIGN PATENT DOCUMENTS

| | | |
|---|---|---|
| EP | 1018619 A1 | 7/2000 |
| FR | 2905753 A1 | 3/2008 |

(Continued)

OTHER PUBLICATIONS

English Translation of the Written Opinion of the International Searching Authority dated Sep. 8, 2009.

*Primary Examiner* — Kenneth Rinehart
*Assistant Examiner* — Gajanan M Prabhu
(74) *Attorney, Agent, or Firm* — The Belles Group, P.C.

(57) ABSTRACT

The invention relates to a device for controlling regenerative burners used as a firing device, particularly for iron and steel product heating furnaces or for radiating tubes for continuous strip steel processing lines, according to which the supply of at least one of the fluids involved in the combustion (fuel and comburent) is carried out through a rotary injector (12) rotating by means of a rotatable actuator (M) so as to supply fluid alternately to one and then the other of the burners (B1, B2), the rotary injector (12) being placed on the comburent inlet duct (6), particularly air, and is provided to partially obstruct the supply pipe (19.1; 19.2) to the burner (B1; B2) such that one portion of the fumes from a regenerator (2.2; 2.1) for the non-operating burner (B2; B1) is led to the operating burner (B1; B2) and such that the other portion of the fumes is discharged to the stack.

19 Claims, 3 Drawing Sheets

(56) References Cited

U.S. PATENT DOCUMENTS

| | | | |
|---|---|---|---|
| 5,304,059 A | 4/1994 | Tanaka et al. | |
| 5,775,199 A * | 7/1998 | Sell | 91/498 |
| 7,104,787 B2 * | 9/2006 | Collier | 431/215 |
| 7,322,375 B2 * | 1/2008 | Goldfarb et al. | 137/625.32 |
| 2010/0047727 A1 | 2/2010 | Chever et al. | |

FOREIGN PATENT DOCUMENTS

| | | |
|---|---|---|
| JP | 2000337614 A | 12/2000 |
| JP | 2000346345 A | 12/2000 |

\* cited by examiner

DEVICE FOR CONTROLLING REGENERATIVE BURNERS

CROSS REFERENCE TO RELATED APPLICATIONS

This application is a National Phase filing under 35 U.S.C. §371 of PCT/IB2009/052742 filed on Jun. 25, 2009; and this application claims priority to Application No. 08/04020 filed in France on Jul. 15, 2008 under 35 U.S.C. §119; the entire contents of all are hereby incorporated by reference.

The invention relates to a device for controlling regenerative burners which are used as firing equipment, for example for reheating furnaces, particularly reheating furnaces for reheating steelmaking products, notably slabs, blooms, slugs or billets, to raise the product that is to be reheated to the temperature required for rolling, and radiant tubes for lines of continuous processing of steel strip, for example annealing lines and galvanizing lines.

Regenerative burners are systems with high combustion efficiency because of the fact that one of the two fluids involved in the combustion, generally the air, is preheated to a high temperature through the regenerative matrixes of the burners. The fact that they operate in pairs as burner and exhaust alternately means that they require a special valving system.

FR 2 905 753 relates to a reheating furnace equipped with such burners.

In the accompanying drawings, FIG. 1 shows a schematic vertical cross section through a pair of regenerative burners B1, B2 mounted facing one another on longitudinally opposed walls of a furnace.

Each burner comprises a fuel injection tube 1.1, 1.2 and a regenerative matrix 2.1, 2.2 formed of a compact mass of heat-accumulating materials. On the opposite side of each matrix to the combustion zone there are provided, respectively, an inlet duct 3.1, 3.2 for oxidant, generally air, and an outlet duct 4.1, 4.2 for the flue gases.

An electrically operated valve 5.1, 5.2 respectively is provided on the air ducts 3.1, 3.2 which are supplied by a common inlet pipe 6. An electrically operated valve 7.1, 7.2 is respectively provided on the outlet ducts 4.1, 4.2 which meet up with a common flue pipe 8, connected to an exhaust.

The supply of fuel is afforded via a common pipe 9, via branches with respective electrically operated valves 10.1, 10.2 for the tubes 1.1 and 1.2.

When the burner B2 is firing, the fuel inlet valve 10.2, the air inlet valve 5.2 and the flue gas discharge valve 7.1 are open. The other valves are closed. The burner B1 is switched off and acts as the exhaust and the combustion gases pass through the matrix 2.1 to be discharged via the pipe 4.1, the valve 7.1 and the pipe 8.

When the burner B1 is firing, the burner B2 is switched off and acts as an exhaust. The position of the electrically operated valves is reversed and the combustion air passes through the regenerative matrix 2.1, where it is heated up, before being mixed with the fuel in order to be burnt.

Thus, where just one air electrically operated valve is used on a conventional burner, four electrically operated valves 5.1, 5.2, 7.1, 7.2 are needed on a regenerative pair, two of which are hot 7.1, 7.2.

Leaving aside the additional expense created by this system in terms of cost of procurement, the cost of maintaining the valving system is also high because the valves are very high duty because of the high number of opening and closing cycles which typically occur every 30 seconds.

The hot valves which discharge the flue gases in particular present a technical problem when they start to leak after a high number of opening and closing cycles, something which ultimately occurs with these hot valves. The lack of gastightness of the valve on the flue gas side causes some of the combustion air to leak to the exhaust. This results in a lack of air supplied to the burner. The soot produced as a result of incomplete combustion fouls the regenerators, further limiting the combustion air flow rate. The burners ultimately become completely clogged.

Furthermore, the flue gases laden with unburnt matter meet up with the leaked air in the pipework downstream and this leads to a risk of postcombustion in the pipes.

Maintenance on these valves in the hot state soon becomes a restricting factor which often dictates carrying out the combustion with a considerable amount of excess air. However, these burners already have a tendency to produce a great deal of nitrogen oxide. Poor control of the excess air exacerbates this phenomenon.

On furnaces of the reheating type with multiple high-capacity burners, the onset of this problem is sufficiently slow that action can be taken before failure occurs.

On radiant tube systems the problem soon becomes unmanageable, because each unit is likely to lose its control settings with no warning. Finally, the use of low powers does nothing to simplify flow regulation.

The supply of fuel to the burners requires two electrically operated valves 10.1, 10.2 which are likewise subjected to a very heavy duty cycle with a large number of cycles of opening and of closing.

It is a key object of the invention to reduce if not eliminate the operating defects mentioned hereinabove in spite of the high frequency of opening and closing of the circuits.

U.S. Pat. No. 3,170,680 discloses a glassmaking furnace comprising regenerators. Each regenerator supplies several fuel injectors. In this type of furnace there are not, strictly speaking, any burners but there are fuel injectors it being understood that the temperature level is such that the fuel self-ignites. That document does not describe any air injector but describes supply piping or ducting. The field of application is different from that of the invention which relates to regenerative burners, each being equipped with an individual regenerative matrix and with an injector.

The proposed invention, which is particularly well suited to small power units, makes it possible to avoid the abovementioned problems by making it possible:
- to eliminate valves, particularly hot valves, thereby avoiding any deterioration of such valves over time, leading to a reduction in the costs of the installation,
- to better manage the excess air,
- to reduce the nitrogen oxides produced during combustion by using a flue gas recirculation device.

According to the invention, a device for controlling regenerative burners used as firing equipment, particularly for furnaces to reheat steelmaking products or radiant tubes for lines for the continuous treatment of steel strip, is characterized in that:
- at least one of the fluids involved in combustion (the fuel and the oxidant) is supplied using a rotary injector by means of a rotary actuator so as to supply one of the burners then the other, in turn,
- the inlet of air and the outlet of flue gases for a burner are performed by one and the same supply piping,
- the rotary injector is positioned on the inlet pipe for oxidant, particularly air, and is designed to partially shut off the supply piping leading to the burner so that some of the flue gases from a regenerator of the burner that is switched off is drawn toward the burner that is switched on and the other proportion of the flue gases is discharged to the exhaust.

The regenerative burners are combined in pairs and operate in turn. One and the same supply piping for a burner provides the supply of air when a burner is switched on and takes away the flue gases from the other burner of the pair when this first burner is switched off and the other burner is switched on, and vice versa for this other burner of the pair.

Advantageously, the recirculation of a proportion of the combustion flue gases toward the burner that is switched on is performed by an entrainment effect associated with the speed of the fluid on the exhaust side of the injector.

The injector may comprise a cylindrical hollow body which, at one end, has a frustoconical nozzle which opens radially via a small-diameter outlet orifice, it being possible for the nozzle to be positioned facing the inlet of an air pipe leading to a burner, so that flue gas entrainment zones are created by the ejection of air through the outlet orifice.

The injector may comprise, toward its end furthest from the nozzle, a part positioned in a cylindrical housing produced in the form of a cold air valve with two diametrically opposed orifices provided in the part, and one orifice provided in the wall of the housing, level with the orifices.

In general, a ring made of a material with a low coefficient of friction is positioned between the body of the injector and the wall of the housing. The ring may be made of bronze.

The rotary actuator may consist of an electric motor.

Apart from the provisions set out hereinabove, the invention consists of a certain number of other provisions that will be discussed more fully hereinbelow with reference to an exemplary embodiment described with reference to the accompanying drawings, but which is not in any way limited. In these drawings.

Figure 3:
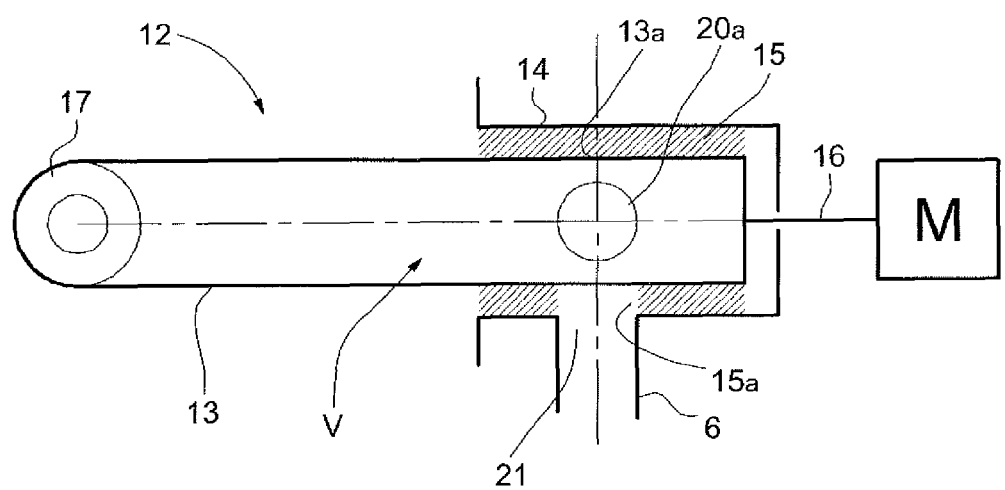
FIG. 3 is a vertical axial section, on a large scale, through the rotary injector in the closed position.
Figure 4:
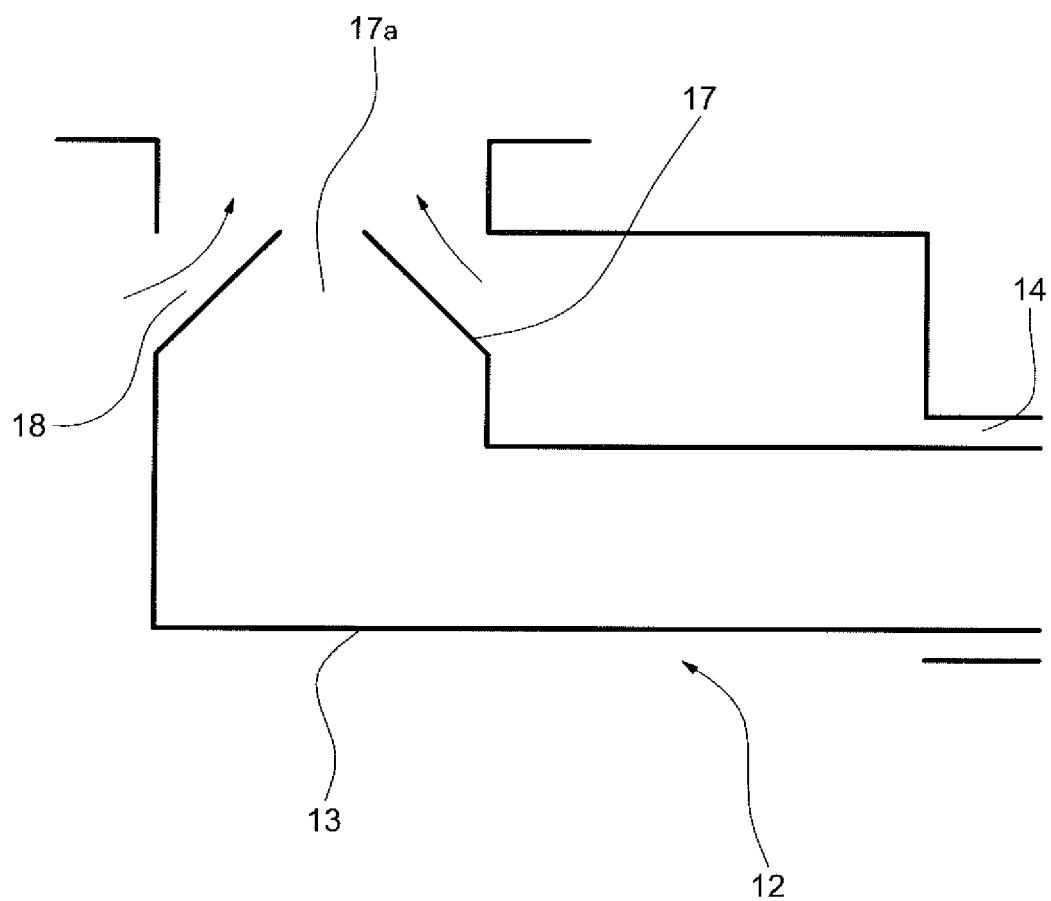
FIG. 4 is a vertical section, on a larger scale, through the nozzle of the injector and a pipe inlet.

The invention is described with reference to FIGS. 2 to 4 of the accompanying drawings. The description is given for an application to radiant U-tubes 11, only the ends of the parallel legs of which have been depicted. The description can be carried across in its entirety to other applications of regenerative burners, such as for pre-rolling reheating furnaces.

Figure 1:
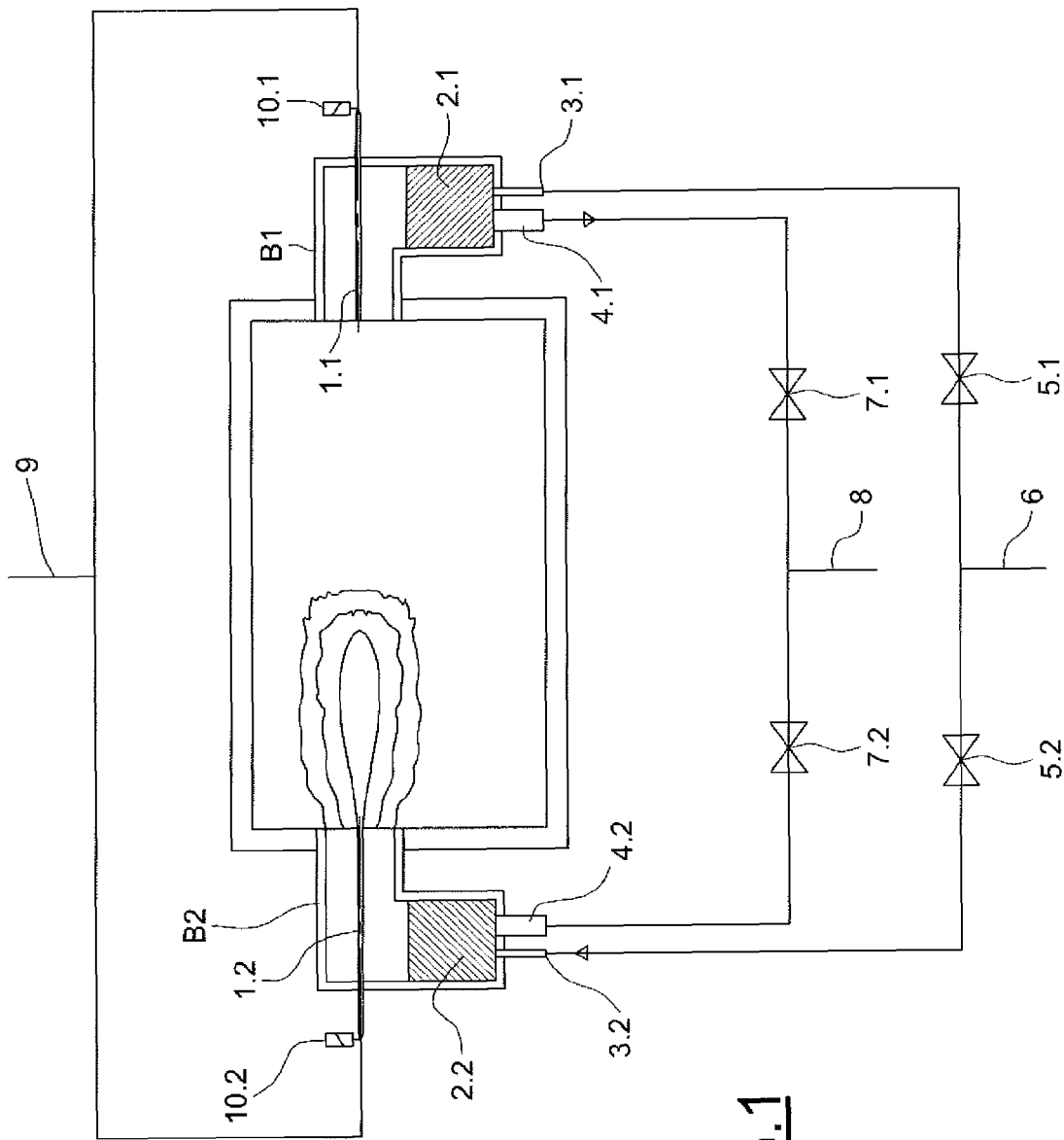
FIG. 1 is a schematic vertical section through a pair of regenerative burners according to the prior art.

Those elements in FIG. 2 that are similar to elements described with reference to FIG. 1 are denoted by the same numerical references and not described again.

Figure 2:
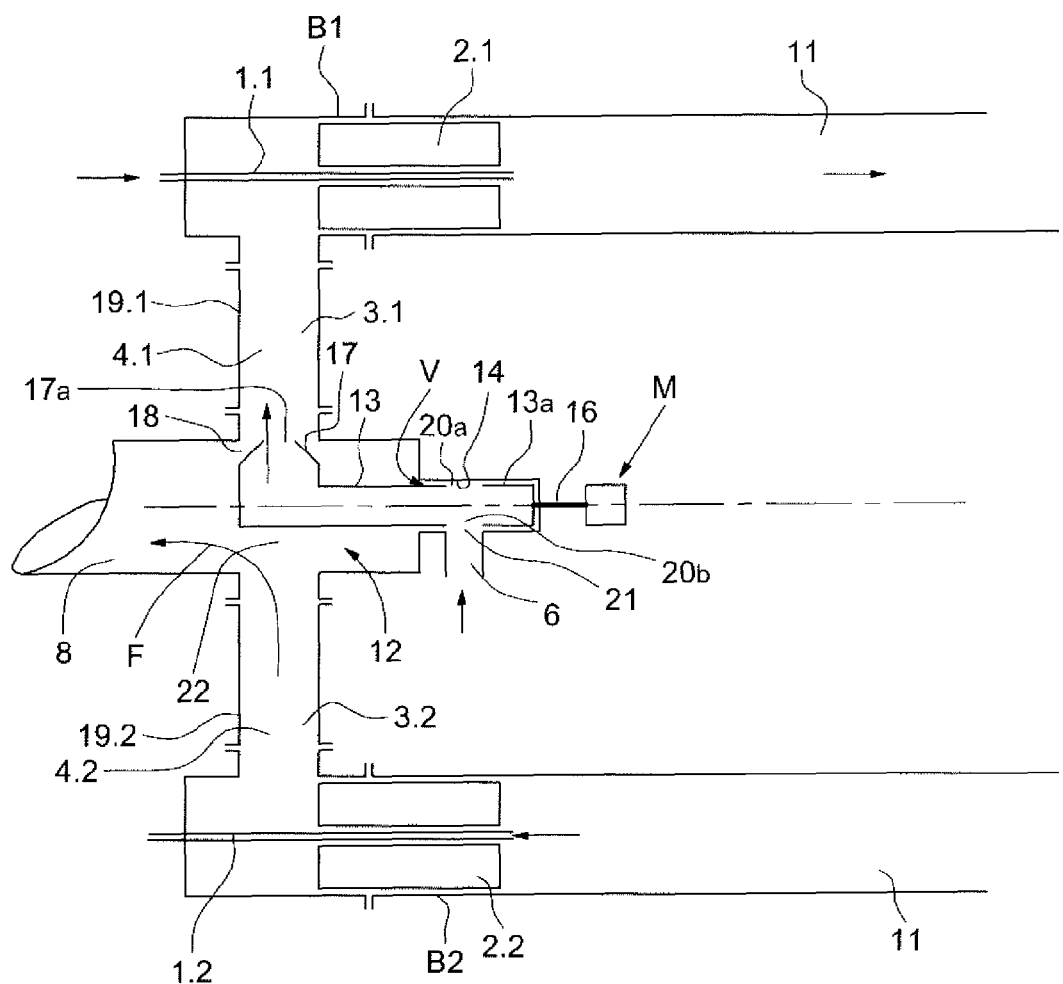
FIG. 2 is a schematic vertical section through a pair of regenerative burners with a control device according to the invention.

In the depiction of FIG. 2, the burner B1 is firing while the burner B2 is switched off and acts as an exhaust.

The electrically operated valves that supply air and discharge flue gases have been omitted.

According to the invention, the supply of combustion air is achieved by means of a rotary injector 12 that turns by means of a three-position 180° rotary actuator M which switches the air inlet to the top burner B1 then switches combustion over to the bottom burner B2. The third position is an intermediate position and corresponds to both burners being switched off. The actuator M, generally consisting of an electric motor, may be fitted with end-of-travel contacts so that its position can be monitored.

The rotary injector 12 comprises a cylindrical hollow body 13 arranged coaxially inside a cylindrical housing 14 which supports it and guides its rotation. Advantageously, a ring 15 (FIG. 3) made of a material with a low coefficient of friction, notably bronze, is positioned between the body 13 and the housing 14. In the example illustrated in FIG. 2, the axis of the body 13 is horizontal, but a different orientation, notably a vertical one, is possible.

The body 13 is closed at its axial end facing towards the actuator M. This end is connected by a shaft 16 to the actuator. At its other end, the body 13 comprises an injection nozzle 17 which opens radially into a space 18.

The inlet of air 3.1 into and the outlet 4.1 of flue gases from the burner B1 are performed by one single same pipe 19.1, also known as the supply piping. The same is true of the burner B2 and the pipe 19.2. More specifically, when the burner B1 is switched on, the pipe 19.1 supplies air to the burner B1, whereas the flue gases from the burner B1 are discharged by the pipe 19.2 of the burner B2 switched off. When the burner B1 is switched off while the burner B2 is switched on, the pipe 19.1 discharges the flue gases from the burner B2, and the pipe 19.2 supplies air to the burner B2.

The axes of the pipes 19.1, 19.2 are aligned and are orthogonal to the axis of rotation of the body 13. The ducts 19.1, 19.2 open into the space 18. The outlet of the nozzle 17 may be positioned either facing the duct 19.1 or, by rotation through 180°, facing the duct 19.2, or in an intermediate switched-off position.

The part 13a of the body 13 that is positioned in the housing 14 is produced in the form of a "cold air valve" V and in its cylindrical wall has two diametrically opposed orifices 20a, 20b. The air inlet pipe 6 opens into the cylindrical wall of the housing 14 via an orifice 21 situated, in the direction of the axis of the body 13, level with the orifices 20a, 20b. If a bronze ring 15 is provided (FIG. 3), it has an orifice 15a positioned in line with the orifice 21.

The flue pipe 8 opens into the space 18 and there is enough of a passage 22, on the opposite side to the nozzle 17, between the body 13 and the inlet of the pipe 8 for the flue gases to pass, in the direction of the arrow F, toward the exhaust which has not been depicted.

The nozzle 17 has a frustoconical external wall the diameter of which decreases as far as the outlet orifice 17a. As is clearly visible in FIG. 4, when the nozzle 17 is positioned facing the inlet of a pipe 19.1 or 19.2, a configuration akin to that of a venturi is obtained, and flue gas entrainment zones are created around the frustoconical outer wall, through the ejection of air through the orifice 17a.

The cold air valve V situated at the end of the rotary injector is of the 180° cylindrical type. Its purpose is to cut off the inlet of air in the intermediate position and to supply air in the two operating positions corresponding to the two burners. It remains of simple construction insofar as it does not necessarily need to be rigorously fluidtight when closed.

The injector 12, via its frustoconical nozzle 17 with small outlet orifice 17a, allows the cold air to be accelerated. Combustion air is generally supplied at a high pressure, of the order of 1000 daPa (namely 0.1 bar), thus preventing the air from passing directly into the flue gases.

The speed of the air locally entrains a proportion of the flue gases toward the burner, the other proportion being discharged to the outside of the system. The flue gases are at a moderate temperature, typically of around 200° C., because they have previously been cooled as they passed through the regenerative matrix 2.2 of the burner switched to the exhaust position.

The rotary injector 12 equipped with its cold air valve V is particularly well suited to on/off operation of the burners. In this case, there is no need to provide an additional air flow rate control member upstream of the cold air valve V. For proportional operation of the burners, the variation in air flow rate is achieved upstream of the cold air valve of the injector, for example using a flow regulating valve.

The way in which the device for controlling the regenerative burners 1.1, 1.2 works with the rotary injector 12 is as follows:

In the position illustrated in FIG. 2, the burner B1 is switched on and the burner B2 is switched off. The injector 12 occupies the position for which the orifice 20b of the body 13 communicates with the cold air inlet pipe 6 while the nozzle 17 faces the inlet of the pipe 19.1. The cold combustion air arriving via the pipe 6 is directed via the nozzle 17 into the pipe 19.1. The narrowing of the cross section of the nozzle 17 causes the airspeed at the outlet 17a to increase and causes a proportion of the hot flue gases arriving along the pipe 19.2 to be entrained so that they can be discharged via the pipe 8.

The air/flue gases mixture obtained passes through the regenerative matrix 2.1 which has accumulated heat during the earlier cycle. Appreciably heated up as it leaves the matrix 2.1, it is used for burning, under good conditions, the fuel which arrives through the tube 2.1. The hot flue gases flow through the radiant tube 11 and return, having lost some of their heat, to the burner B2 which is switched off. The still-hot flue gases pass through the matrix 2.2 where they give up some of their heat, and are then directed by the pipe 19.2 to the outlet pipe 8.

In the next cycle, the supply of fuel to the burner B1 is halted while the supply of fuel to the tube 1.2 of the burner B2 is opened. The injector 12 is turned through 180° so that the nozzle 17 opens into the pipe 19.2. The operation is the reverse of that described hereinabove.

The rotary injector 12 therefore acts like a distributor and serves to separate air from flue gases by partially blocking off the supply piping 19.1 (or 19.2) leading to the burner B1 (or B2) so that flue gases are discharged to the exhaust having passed through the regenerator 2.2 (or 2.1) of the burner B2 (or B1) that is switched off, without being entrained toward the burner B1 (or B2) that is in operation.

It is well known to those skilled in the art that recirculating some of the flue gases in the oxidizing air has the effect of reducing the nitrogen oxides formed at the time of combustion.

By blocking the supply piping 19.1 (or 19.2) leading to the burner B1 (or B2) only partially, the speed that the injector imparts to the combustion air allows some of the flue gases to be entrained, contributing toward a reduction in nitrogen oxides.

Finally, as it is no longer beholden to the life of the electrically operated valves, it becomes possible to reduce the duration of the burner switchover cycle, allowing small-sized regenerators 2.1, 2.2 to be built.

A rotary injector similar to the one described previously in respect of the combustion air can also be used for the fuel, as a replacement for the electrically operated valves 10.1 and 10.2 in FIG. 1. Such a rotary injector for the fuel would have no nozzle 17, but a single orifice at the site of the nozzle. This then would offer double recirculation of flue gases by the combustion air and by the fuel with a view to reducing the level of NOx produced.

The invention claimed is:

1. A device for controlling regenerative burners used as firing equipment for furnaces to reheat steel making products or radiant tubes for lines for the continuous treatment of steel strip, wherein at least one of the fluids involved in combustion, a fuel and an oxidant, is supplied using a rotary injector having rotating injection nozzle which is rotated by a rotary actuator so as to supply one of the burners then the other, in turn, the inlet of air and the outlet of flue gases for a burner are performed by one and the same supply piping, the rotary injector is positioned on the inlet pipe for oxidant, and the rotating injection nozzle is configured to partially block the supply piping leading to the burner so that some of the flue gases from a regenerator of the burner that is switched off are drawn toward the burner that is switched on and the other proportion of the flue gases is discharged to the exhaust.

2. The device as claimed in claim 1, wherein the recirculation of a proportion of the combustion flue gases toward the burner that is switched on is performed by an entrainment effect associated with the speed of the fluid on the exhaust side of the injector.

3. The device as claimed in claim 1 or 2, wherein the injector comprises a cylindrical hollow body which, at one end, the injection nozzle comprises a frustoconical nozzle which opens radially via a small-diameter outlet orifice, it being possible for the nozzle to be positioned facing the inlet of an air pipe leading to a burner, so that flue gas entrainment zones are created by the ejection of air through the outlet orifice.

4. The device as claimed in claim 3, wherein the injector comprises: toward its end furthest from the nozzle, a part positioned in a cylindrical housing produced in the form of a cold air valve with two diametrically opposed orifices provided in the part, and one orifice provided in the wall of the housing level with the orifices.

5. The device as claimed in claim 4, wherein a ring, made of a material with a low coefficient of friction is positioned between the body of the injector and the wall of the housing.

6. The device as claimed in claim 5, wherein the ring is made of bronze.

7. The device as claimed in claim 1, wherein the rotary actuator consists of an electric motor.

8. A device for controlling regenerative burners used as firing equipment for furnaces to reheat steel making products or radiant tubes for lines for the continuous treatment of steel strip, wherein an oxidant is supplied using a rotary injector having rotating injection nozzle which is rotated by a rotary actuator so as to supply one of the burners then the other, in turn, the inlet of air and the outlet of flue gases for a burner are performed by one and the same supply piping, the rotary injector is positioned on the inlet pipe for oxidant, and the rotating injection nozzle is configured to partially block the supply piping leading to the burner so that some of the flue gases from a regenerator of the burner that is switched off are drawn toward the burner that is switched on and the other proportion of the flue gases is discharged to the exhaust, wherein the rotary injector is configured with a rotational position in which the oxidant from the inlet pipe is cut off from both burners.

9. The device as claimed in claim 8, wherein the recirculation of a proportion of the combustion flue gases toward the burner that is switched on is performed by an entrainment effect associated with the speed of the fluid on the exhaust side of the injector.

10. The device as claimed in claim 8, wherein the injector comprises a cylindrical hollow body which, at one end, the injection nozzle comprises a frustoconical nozzle which opens radially via a small-diameter outlet orifice, it being possible for the nozzle to be positioned facing the inlet of an air pipe leading to a burner, so that flue gas entrainment zones are created by the ejection of air through the outlet orifice.

11. The device as claimed in claim 10, wherein the rotary injector comprises an air valve which comprises two diametrically opposed orifices, and one orifice provided in the wall of the housing level with the orifices.

12. The device as claimed in claim 11, wherein a ring made of a material with a low coefficient of friction is positioned between the body of the injector and the wall of the housing.

13. The device as claimed in claim 12, wherein the ring is made of bronze.

14. A device for controlling regenerative burners used as firing equipment for furnaces to reheat steel making products or radiant tubes for lines for the continuous treatment of steel strip, wherein a fuel is supplied using a rotary injector having rotating injection nozzle which is rotated by a rotary actuator so as to supply one of the burners then the other, in turn, the inlet of air and the outlet of flue gases for a burner are performed by one and the same supply piping, the rotary injector is positioned on the inlet pipe for the fuel, and the rotating injection nozzle is configured to partially block the supply piping leading to the burner so that some of the flue gases from a regenerator of the burner that is switched off are drawn toward the burner that is switched on and the other proportion of the flue gases is discharged to the exhaust, wherein the rotary injector is configured with a rotational position in which the fuel from the inlet pipe is cut off from both burners.

15. The device as claimed in claim 14, wherein the recirculation of a proportion of the combustion flue gases toward the burner that is switched on is performed by an entrainment effect associated with the speed of the fluid on the exhaust side of the injector.

16. The device as claimed in claim 14, wherein the injector comprises a cylindrical hollow body which, at one end, the injection nozzle comprises a frustoconical nozzle which opens radially via a small-diameter outlet orifice, it being possible for the nozzle to be positioned facing the inlet of an air pipe leading to a burner, so that flue gas entrainment zones are created by the ejection of air through the outlet orifice.

17. The device as claimed in claim 16, wherein the rotary injector comprises an air valve which comprises two diametrically opposed orifices, and one orifice provided in the wall of the housing level with the orifices.

18. The device as claimed in claim 17, wherein a ring made of a material with a low coefficient of friction is positioned between the body of the injector and the wall of the housing.

19. The device as claimed in claim 18, wherein the ring is made of bronze.

\* \* \* \* \*